March 16, 1926.
F. A. STEVENS ET AL
1,576,870
OPHTHALMIC MOUNTING
Filed May 21, 1925
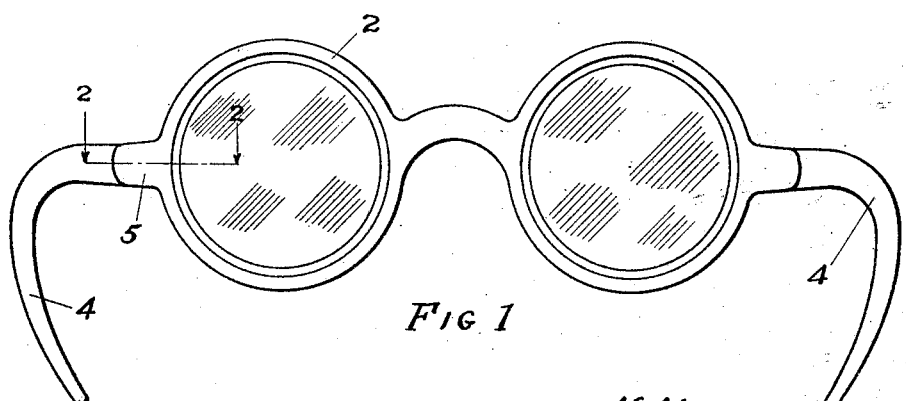
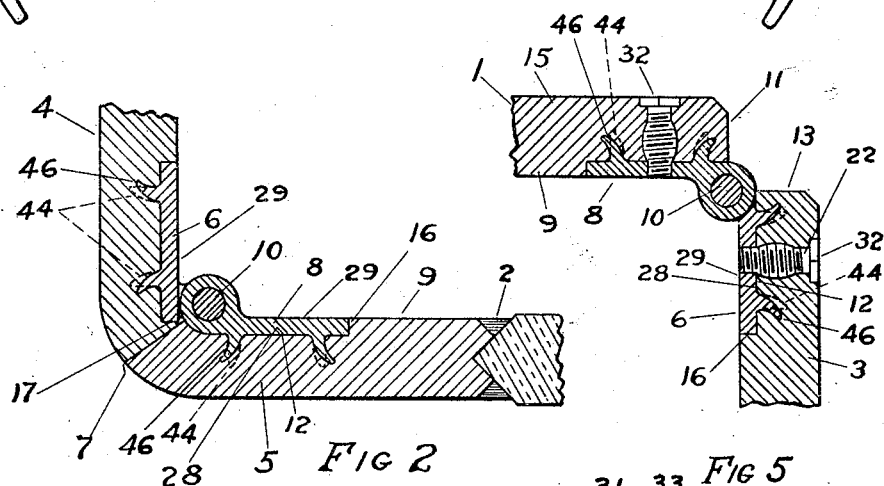
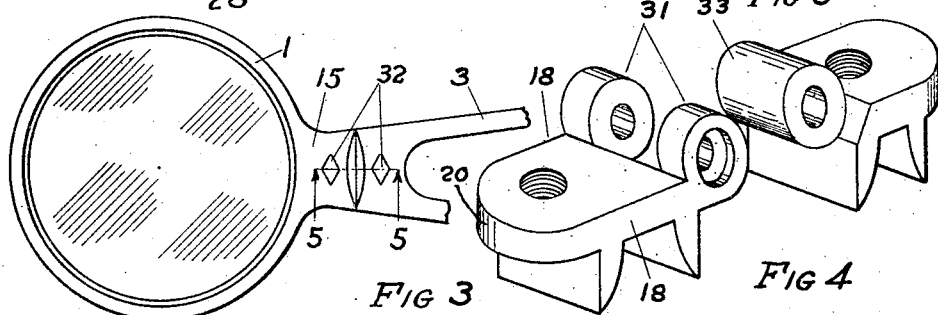
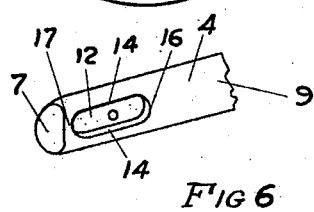
INVENTORS
FREDERICK A STEVENS
JAMES W WELSH
by
David Rines
ATTORNEY Patented Mar. 16, 1926.

1,576,870

UNITED STATES PATENT OFFICE.

FREDERICK A. STEVENS AND JAMES W. WELSH, OF PROVIDENCE, RHODE ISLAND, ASSIGNORS TO BAUSCH AND LOMB OPTICAL COMPANY, OF ROCHESTER, NEW YORK, A CORPORATION OF NEW YORK.

OPHTHALMIC MOUNTING.

Application filed May 21, 1925. Serial No. 31,751.

*To all whom it may concern:*

Be it known that we, FREDERICK A. STEVENS and JAMES W. WELSH, citizens of the United States, and residents of Providence, in the county of Providence and State of Rhode Island, have jointly invented a new and useful Improvement in Ophthalmic Mountings, of which the following is a specification.

The present invention relates to articles of manufacture comprising members constituted of plastic material to which are secured metal members, and it has more particular application to ophthalmic mountings comprising non-metal members that are connected together by metal hinges.

In commercial ophthalmic mountings of the above-described character, the hinge plates have hitherto been secured to the non-metal members by pairs of rivets passing through the hinge plates and the members. These have not been fully satisfactory. It has been proposed to mount beveled hinge plates in previously prepared, dovetailed grooves of the non-metal members, and to hold them in place by cement or by single screws. There is a tendency, however, for the beveled walls of the hinge plates to twist or turn in their grooves, causing them to bite into the dovetailed-groove walls and weakening the brittle, non-metal material; the non-metal material, furthermore, will shrink, in time, causing enlargement of the grooves; so that ultimately the hinge plates would become so loosened as to impair the utility of the mounting.

A chief object of the present invention is to improve upon ophthalmic mountings of the above-described character, to the end that a better joint may be provided between the metal and the non-metal parts, and the serviceableness and the utility of the mounting as a whole enhanced.

According to the invention disclosed and claimed in a copending application, Serial No. 477,146, filed June 13, 1921, of which the present application is a continuation in part, a metal hinge plate, that is provided with beveled, suitably projecting wings, is securely fitted into a suitably shaped recess of the non-metallic member, and pressed tightly into the recess, so as to cause the beveled wings to bite or wedge into, and become embedded within, the non-metal material. As the non-metal material is a plastic substance, like zylonite, the plastic mass becomes compressed in between the wings. The walls of the recess acting upon the walls of the metal plate upon one side, and the compressed plastic mass acting upon the inner sides of the wings upon the other, a very effective joint is produced, preventing twisting or turning of the metal. A single rivet or screw extending through the non-metal material and the metal plate is found to be sufficient to hold the parts together. The rivet or screw is shaped to prevent its turning, so that it can not become loose.

The present application covers a modification of the invention constituting the subject matter of the above-named application, and is filed as a continuation in part of the latter, in response to a requirement of division by the Patent Office.

With the above and other objects in view, the invention consists more particularly of the improved ophthalmic mounting hereinafter described, illustrated in the accompanying drawings, and defined in the appended claims.

In the drawings, Fig. 1 is a front elevation of a pair of spectacles constructed according to a preferred embodiment of the present invention; Fig. 2 is a section, taken upon the line 2—2 of Fig. 1, looking in the direction of the arrows; Fig. 3 is an elevation of a reading glass constructed in accordance with the present invention; Fig. 4 is a perspective view of two preferred hinge plates, shown detached; Fig. 5 is a section taken upon the line 5—5 of Fig. 3, looking in the direction of the arrows, but with the parts in a different position from that shown in Fig. 3; and Fig. 6 is a view of the end of one of the non-metal members provided with a hinge-plate receiving recess.

The invention is illustrated and described in Figs. 1 and 2 in connection with a spectacle mounting comprising a lens-holding frame or front 2 and temples or bows 4. In Figs. 4 and 5, the invention is shown embodied in a reading glass comprising a lens-holding rim 1 and a handle 3. These and similar devices will, to avoid circumlocution of language, be hereinafter referred to in the specification and the claims as ophthalmic mountings. The lens-holding members 1 and 2, the temples 4 and the handle 3 are constituted of plastic, non-metallic material, like celluloid, zylonite or other composition. The term "zylonite" will, for brevity, be employed in the specification and the claims as generic to all such materials.

The temples 4 are pivotally connected with the lens-holding frame 2, and the handle 3 with the lens-holding rim 1, by hinges comprising one-piece hinge plates 6 and 8. Each hinge plate is provided with a base portion having oppositely disposed, substantially flat, inner and outer faces or sides 28 and 29. The hinge plate 6 is provided with two perforated ears or knuckles 31 which are integrally disposed laterally upon one side 29 of each hinge plate, out of the general plane of the base portion, nearer one end thereof than the other, as illustrated. In the illustrated embodiment of the invention, one of the hinge plates is provided with two knuckles 31 and the other hinge plate with one knuckle 33 disposed between the knuckles 31. The hinge plate 8 is similarly provided with a perforated ear or knuckle 33, similarly disposed. The knuckle 33 is disposed between the knuckles 31 and the hinge plates are pivoted together by a pivot pin or pintle 10 that extends through the perforations in the knuckles.

One of the hinge plates, as the hinge plate 8, is mounted upon the rear face of a non-metal end piece 5 that extends integrally at one side of the lens-holding frame 2 or upon the rear face of a corresponding end piece 15 of the lens-holding rim 1. The other hinge plate 6 is mounted upon the inner face of the end portion of a temple 4 or of the handle 3. The said end portion of the temple and the end piece 5 are beveled, as shown at 7, to limit the movement of the temple relatively to the frame 2 to an angle of ninety degrees. One-hundred-and-eighty-degree movement may be provided, as shown in Figs. 3 and 5, by having the end portions of the end piece 9 and of the handle 1 cut away at right angles, as illustrated at 11 and 13. When the members are pivotally swung about the pintle 10 to their limits of movement, the beveled portions 7, Figs. 1 and 2, and the cut-away portions 11 and 13, will be caused to abut.

One face 9 of each of the non-metal members is recessed, the bottom wall of the recess 12 being substantially flat and the recess being shown provided with longitudinally extending walls 14 that may be straight and parallel, if desired, and that are connected by a transversely extending wall 16. There may be a wall 17 opposed to the wall 16 or the recess may be open-ended, as desired. The hinge plates 6 and 8 are similarly substantially flat and are provided with oppositely disposed walls 18 that are connected by a wall 20. The hinge plates and the recesses 12 are so shaped that the hinge plates will fit tightly in the recesses, the hinge plates lying flat against the bottom flat walls of the recesses, with the walls 18 in contact with the walls 14, and the wall 20 in contact with the wall 16. The walls 14, 16, 18 and 20 are made blunt to prevent rotation or twisting of the hinge plates within the recesses 12. A single rivet or screw 22, extending through the hinge plate and the non-metal member, as illustrated in Fig. 5, will be found sufficient to hold the hinge plates within their respective recesses. The rivet or screw is provided with an irregular portion 32 that is sunk into the non-metal material to prevent the rivet or screw turning, and thereby becoming dislodged. The screw is upset to the same end. A more complete description will be found in the abovenamed application.

It is commercially impossible to have the hinge plates fit in the recesses 12 always with exactly the right degree of tightness. A dull cutting tool, for example, will not cut exactly the same-sized recess 12 as when sharp. As non-metal material of the kind employed in ophthalmic mountings of the above-described character always shrinks, moreover, no matter how thoroughly it is cured, a recess that is of just the proper shape and size when made will become larger with the lapse of time. A hinge plate that is merely fitted into place within the recess, therefore, even though it fit properly in the beginning, will soon become undesirably loose, causing the temple to wabble.

This is prevented, according to the present invention, by providing the hinge plate with anchoring or attachment members that project integrally from the sides or edges 18 of the hinge plates and that are caused to bite or wedge laterally into, and become embedded within, the non-metal material. The attachment members of one hinge plate are embedded in the end piece 5 or 15, and those of the other end piece in the temple 4 or the handle 3. The hinge plates become thus securely mounted upon the non-metal members.

The attachment members of the present invention are in the form of spurs 46. The spurs may be two only, as illustrated, or even one only, in number. The spurs 46 are shown at opposite ends of the hinge plate, one of the spurs being nearer the knuckles or ears of the hinge plate than the other. The spurs may extend completely across the hinge plate, as shown in Fig. 4, or only part way across. If properly shaped, the spurs will be caused to bend of their own accord oppositely outward obliquely away from each other when the hinge plate is pressed into position, naturally following the lines of least resistance. The positions originally occupied by the spurs is indicated in dotted lines at 44, and the final embedded position of the spurs is shown in full lines. With spurs so positioned, and with the spurs long enough, the rivets or screws may be entirely omitted, as shown in Figs. 1 and 2, so that the necessity for weakening the non-metal material by riveting is avoided. It is sometimes better, however, in order to avoid unnecessary strain, to employ rivets or their equivalents, as illustrated in Figs. 3 and 5.

Hinges mounted as above described will be firmly and securely and perfectly seated within their recesses, unable to turn or twist or otherwise become loose, and they can not be pulled laterally or longitudinally out of their seats. The hinge plate and the non-metal member upon which it is mounted become, in effect, one unitary member. As the spurs dig their own way into the stock, a very effective joint may, in fact, be provided without previously recessing the non-metal material. The joint is, however, strengthened by the use of the previously formed recess, the walls 14 and 16 of which contact with the walls 18 and 20 of the hinge plate, and the recess makes it possible, furthermore, to sink the hinge plate flush with the face 9 of the non-metal member, improving the appearance of the mounting. The body of the hinge plate is seated flush in the recess, the spurs holding it in place by being embedded or wedged in the plastic material.

The invention is not restricted to the exact embodiments thereof that are illustrated and described herein, but is subject to modification within the spirit and scope of the appended claims.

What is claimed is:

1. The combination, in an ophthalmic mounting, with a non-metal lens frame formed at one side with an extension, and a temple, of a hinged connection between the temple and the extension embodying a member having ears nearer one end thereof than the other, and anchoring projections at opposite ends of said member, one of said projections being nearer the ears than the other.

2. The combination, in an ophthalmic mounting, with a non-metal lens frame having an extension of non-metal material, and a temple of a hinged connection between the temple and the extension embodying a plate, a temple pivoted to the plate, and two anchoring projections on the plate one of which is nearer to the pivot of the hinge than the other.

3. The combination, in an ophthalmic mounting, with a non-metal lens frame having an extension, and a temple, of a hinged connection between the temple and the extension embodying a plate provided with two pivot ears nearer one end of the plate than the other, and two anchoring projections embedded in the metallic material, one of said projections being nearer the pivot ears than the other.

4. A hinge member for use in ophthalmic mountings comprising a plate, pivot ears extending from opposite sides of the plate in one direction, and anchoring projections extending in the opposite direction, one of said projections being nearer to the ears than the other.

5. In an ophthalmic mounting, the combination with a non-metal lens frame formed with an extension at one side beveled at its end, and a temple having an inner end beveled and formed of non-metal material to cooperate with the bevel on the extension of the lens frame, of a hinge connection between the temple and the extension embodying two members, each having a plate portion provided with a pivot ear extending in one direction and each having two anchoring projections extending in the opposite direction, one of said projections being nearer the ears than the other, and a pivot pin connecting the ears of the two members.

6. A mounting comprising a member constituted of plastic material having a substantially flat portion, a metal hinge member having a base portion provided with a substantially flat side held in contact with the flat portion, spurs extending from the flat side biting into and embedded within the material for securing the hinge member to the plastic material, the spurs extending obliquely outward from the base portion, and a hinge knuckle provided upon the opposite side of the base portion.

7. An article of the class described comprising two members and a hinge connecting the members, the hinge comprising two pivoted members, one of the pivoted members comprising a plate provided with two projections anchored in one of the two first-named members, one of the anchoring projections being nearer to the pivot of the hinge than the other.

8. A mounting comprising two non-metal members, and a hinge connecting the members, the hinge comprising two pivoted plates each provided with two projections, the projections of one of the plates being anchored in one of the members and the projections of the other plate being anchored in the other member, one of the anchoring projections of each plate being nearer to the pivot of the hinge than the other.

In testimony whereof, we have hereunto subscribed our names.

FREDERICK A. STEVENS.
JAMES W. WELSH.